United States Patent
Bruno et al.

(10) Patent No.: US 10,745,136 B2
(45) Date of Patent: Aug. 18, 2020

(54) ENVIRONMENTAL CONTROL SYSTEM INCLUDING A COMPRESSING DEVICE

(71) Applicant: Hamilton Sundstrand Corporation, Windsor Locks, CT (US)

(72) Inventors: Louis J. Bruno, Ellington, CT (US); Harold W. Hipsky, Willington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 818 days.

(21) Appl. No.: 14/470,529

(22) Filed: Aug. 27, 2014

(65) Prior Publication Data

US 2015/0065025 A1    Mar. 5, 2015

Related U.S. Application Data

(60) Provisional application No. 61/872,961, filed on Sep. 3, 2013, provisional application No. 61/871,441, filed on Aug. 29, 2013.

(51) Int. Cl.
| | |
|---|---|
| *B64D 13/04* | (2006.01) |
| *B64D 13/06* | (2006.01) |
| *B64D 13/08* | (2006.01) |
| *F02C 7/18* | (2006.01) |

(52) U.S. Cl.
CPC ............ *B64D 13/04* (2013.01); *B64D 13/06* (2013.01); *B64D 13/08* (2013.01); *F02C 7/185* (2013.01); *B64D 2013/0618* (2013.01); *Y02T 50/56* (2013.01)

(58) Field of Classification Search
CPC combination set(s) only.
See application file for complete search history.

(56) References Cited

U.S. PATENT DOCUMENTS

| | | | |
|---|---|---|---|
| 4,021,215 A | 5/1977 | Rosenbush et al. |
| 4,779,644 A | 10/1988 | Benson |
| 5,014,518 A | 5/1991 | Thomson et al. |
| 5,086,622 A | 2/1992 | Warner |
| 5,461,882 A | 10/1995 | Zywiak |
| 5,701,755 A | 12/1997 | Severson et al. |
| 5,704,218 A | 1/1998 | Christians et al. |
| 5,967,461 A | 10/1999 | Farrington |

(Continued)

FOREIGN PATENT DOCUMENTS

| | | |
|---|---|---|
| CN | 101743166 A | 6/2010 |
| CN | 103562067 A | 2/2014 |

(Continued)

OTHER PUBLICATIONS

EP Extended EP Search Report for EP Application No. 1716776.8 dated Jul. 27, 2017; 8 Pages.

(Continued)

*Primary Examiner* — Steven B McAllister
*Assistant Examiner* — Elizabeth M. May
(74) *Attorney, Agent, or Firm* — Cantor Colburn LLP

(57) ABSTRACT

A compressing device added to a cabin air conditioning system to increase a pressure of air in the cabin air conditioning system itself and, thus, allow for lower pressure air to be bled from the engine. For instance, the compressing device allows air to be bled from a low, rather than a high, pressure locations of the engine.

3 Claims, 3 Drawing Sheets

(56) References Cited

U.S. PATENT DOCUMENTS

| | | | |
|---|---|---|---|
| 6,065,302 A | 5/2000 | Sada et al. | |
| 6,148,622 A | 11/2000 | Sanger | |
| 6,193,878 B1 | 2/2001 | Morse et al. | |
| 6,199,387 B1 | 3/2001 | Sauterleute | |
| 6,381,969 B1 | 5/2002 | Afeiche et al. | |
| 6,427,471 B1 | 8/2002 | Ando et al. | |
| 6,457,318 B1 | 10/2002 | Lui et al. | |
| 6,484,518 B1 | 11/2002 | Laugt | |
| 6,883,335 B2 | 4/2005 | Axe et al. | |
| 7,017,365 B2 | 3/2006 | Haas et al. | |
| 7,171,819 B2 * | 2/2007 | Lui | B64D 13/06 454/71 |
| 7,322,202 B2 | 1/2008 | Zywiak et al. | |
| 7,334,423 B2 | 2/2008 | Bruno et al. | |
| 7,607,318 B2 | 10/2009 | Lui et al. | |
| 7,797,962 B2 | 9/2010 | Kresser et al. | |
| 7,849,702 B2 | 12/2010 | Parikh | |
| 7,975,499 B2 | 7/2011 | Defrancesco | |
| 8,418,495 B2 | 4/2013 | Merritt et al. | |
| 9,146,004 B2 | 9/2015 | Mayo et al. | |
| 9,169,023 B2 | 10/2015 | Mayo et al. | |
| 9,205,925 B2 | 12/2015 | Bruno et al. | |
| 9,487,300 B2 | 11/2016 | Klimpel et al. | |
| 2002/0152765 A1 | 10/2002 | Sauterleute et al. | |
| 2003/0051500 A1 | 3/2003 | Asfia et al. | |
| 2004/0194493 A1 | 10/2004 | Army et al. | |
| 2004/0195447 A1 | 10/2004 | Claeys | |
| 2005/0011214 A1 | 1/2005 | Ratliff | |
| 2005/0115249 A1 | 6/2005 | Haas et al. | |
| 2006/0162371 A1 | 7/2006 | Lui et al. | |
| 2008/0264084 A1 | 10/2008 | Derouineau et al. | |
| 2011/0016863 A1 | 1/2011 | Ernst | |
| 2013/0133348 A1 | 5/2013 | Squier | |
| 2014/0166812 A1 | 6/2014 | Ji | |
| 2014/0326010 A1 | 11/2014 | Kawakami et al. | |
| 2015/0107261 A1 | 4/2015 | Moes et al. | |
| 2015/0251765 A1 | 9/2015 | Jonqueres et al. | |
| 2015/0307183 A1 | 10/2015 | Bruno et al. | |
| 2015/0307196 A1 | 10/2015 | Bruno | |
| 2016/0144965 A1 | 5/2016 | Bruno et al. | |
| 2016/0231031 A1 | 8/2016 | Bruno | |

FOREIGN PATENT DOCUMENTS

| | | | |
|---|---|---|---|
| CN | 103946111 A | 7/2014 | |
| EP | 1327582 A1 | 7/2003 | |
| EP | 2937287 A1 | 10/2015 | |
| EP | 3025962 A1 | 6/2016 | |
| EP | 3095702 A1 | 11/2016 | |
| EP | 3103721 A1 | 12/2016 | |
| GB | 2355520 A * | 4/2001 | B64D 13/06 |

OTHER PUBLICATIONS

Extended EP Search Report for EP Application No. 14182692.5 dated Feb. 5, 2015; 6 Pages.

Extended EP Search Report for EP Application No. 15189018.3 dated Feb. 23, 2016; 7 Pages.

Chinese Office Action for Chinese Application No. 201510646904.6 dated Sep. 5, 2018; 19 Pages.

* cited by examiner

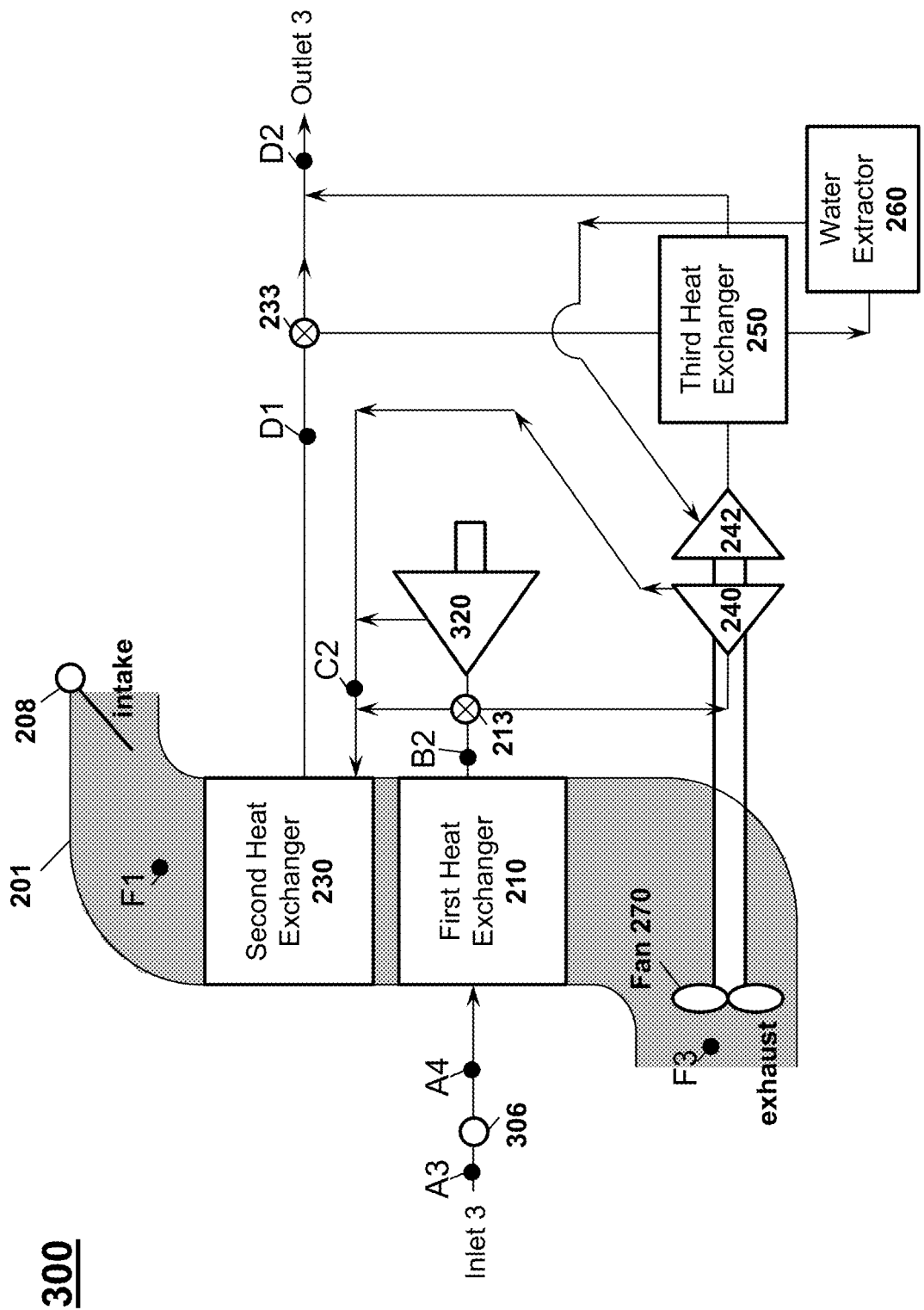

ENVIRONMENTAL CONTROL SYSTEM INCLUDING A COMPRESSING DEVICE

CROSS REFERENCE TO RELATED APPLICATIONS

This application claims the benefit of U.S. Application No. 61/871,441, filed on Aug. 29, 2013, and U.S. Application No. 61/872,961, filed on Sep. 3, 2013, which is incorporated herein by reference in its entirety.

BACKGROUND OF THE INVENTION

An aircraft has a power structure that is comprised of several components, such as an engine, an environmental control system and a thermal management system. These systems are designed relatively independently from each other with power being transferred from one system to another.

An environmental control system (ECS) supplies pressurized air to any environment, such as a cabin and flight deck of an aircraft, for both comfort and pressurization. The pressurized air supplied by the ECS may originate from a compressor stage of an engine (e.g., via a bleed air system) and/or directly from exterior air (e.g., via a ram air system). The interaction of the ECS with the engine in a bleed air system influences how much fuel burn by the engine is needed to perform operations, such as supplying pressurized air, related to that interaction.

For example, in a bleed air system of an aircraft, air is extracted from an engine core at a pre-defined stage location in an engine compressor region of the engine core to provide cooling air to an aircraft cabin. Yet, at present, the pre-defined stage location is limited to a high pressure location of the engine compressor region so that pressure requirements of the bleed air system of the aircraft are met. Unfortunately, the selection of the high pressure location increases or negatively influences airplane fuel burn.

BRIEF DESCRIPTION OF THE INVENTION

According to one embodiment, a compressing device is added to a cabin air conditioning system to increase a pressure of air in the cabin air conditioning system itself and, thus, allow for lower pressure air to be bleed from the engine. For instance, the compressing device allows air to be bled from a low, rather than a high, pressure locations of the engine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a block diagram of an example of a cabin air conditioning system that includes an electric fan according to one embodiment.

DETAILED DESCRIPTION OF THE INVENTION

A detailed description of one or more embodiments of the disclosed apparatus and method are presented herein by way of exemplification and not limitation with reference to the Figures.

As indicated above, connecting a bleed air system to a high pressure location of an engine compressor region has a negative effect on a fuel burn of an engine. Thus, what is needed is a compressing device to be added to the bleed air system to increase a pressure of air while within the bleed air system to, thus, allow for connecting the bleed air system to a low pressure location of the engine compressor region.

In general, embodiments of the present invention disclosed herein may include A system comprising a plurality of heat exchangers; a medium flowing through the plurality of heat exchangers, wherein the medium is bled from a low pressure location of an engine core through the plurality of heat exchangers into a chamber; and a compressing device in communication with first and second heat exchangers of the plurality of heat exchangers and that regulates a pressure of the medium flowing from the first heat exchanger to the second heat exchanger. In another embodiment, the present invention disclosed herein may include a compressing device of an environmental control system of an aircraft, in communication with first and second heat exchangers of a plurality of heat exchangers, configured to regulate a pressure of air flowing from the first heat exchanger to the second heat exchanger, wherein the air is bled from a low pressure location of an engine core through the plurality of heat exchangers into a cabin of the aircraft. In another embodiment, the present invention disclosed herein may include a method of providing air, comprising coupling a first heat exchanger of a plurality of heat exchangers to a low pressure portion of an turbine; coupling a compressing device to an output of the first heat exchanger; coupling an output of the compressing device to a second heat exchanger of the plurality of heat exchangers; and fluidly coupling an output of the second heat exchanger to a cabin.

Figure 1:
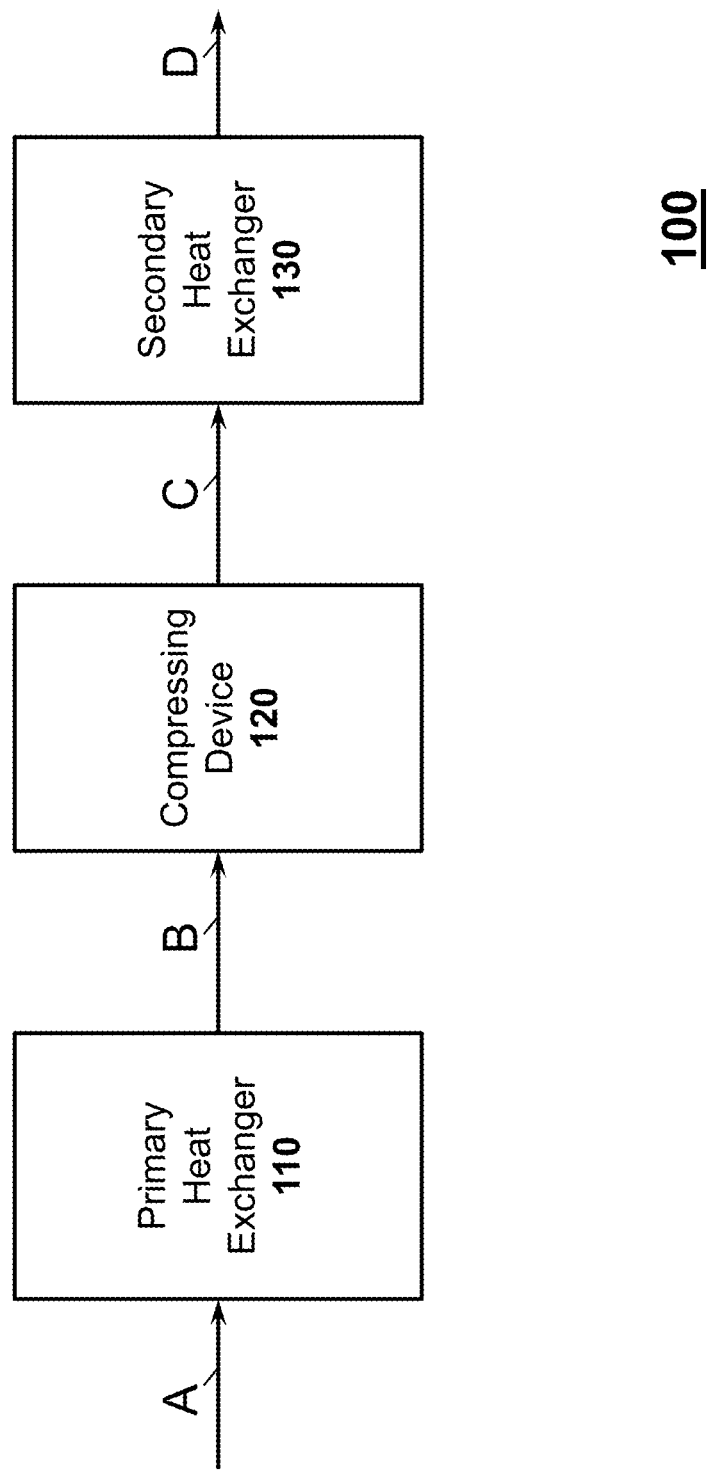
FIG. 1 is a block diagram of an example of an environmental control system.

For example, FIG. 1 illustrates the system 100 comprising a primary heat exchanger 110, a compressing device 120, and a secondary heat exchanger 130, where the compressing device 120 regulates a pressure of a medium (e.g., air) flowing within the system 110 at a first flow rate. That is, in the system 100, the compressing device 120 boostS the pressure of the medium as it exits the primary heat exchanger 110 so that the system 100 may receive the medium at its input at a lower pressure.

In one embodiment, the system 100 is any environmental control system (ECS) of a vehicle, such as an aircraft or watercraft, that provides air supply, thermal control, and cabin pressurization for a crew and passengers of the vehicle. The system may also include avionics cooling, smoke detection, and fire suppression. For example, on an aircraft, air is supplied to the ECS by being "bled" from a compressor stage of a gas turbine engine, upstream of a combustor. The temperature and pressure of this "bleed-air" varies widely depending upon which compressor stage and a revolutions per minute of the gas turbine engine. To achieve the desired temperature, the bleed-air is cooled as it is passed through at least one heat exchanger.

Heat exchangers (e.g., a primary heat exchanger 110 and a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) is blown across the heat exchanger at a variable cooling airflow to control the final air temperature of the bleed-air.

A compressor or fan (e.g., the compressing device 120) is a mechanical device that continuously pressurizes or regulates a pressure of a medium (e.g., increasing the pressure of a gas by reducing its volume). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In operation, the primary heat exchanger 110 of the system 100 receives (e.g., arrow A) a medium at a first pressure and first temperature. The primary heat exchanger 110 then cools the medium to a second pressure and a second temperature, which have a lower value than the first pressure and the first temperature. Next, the medium is communicated (e.g., arrow B) to the compressing device 120 that raises the medium to a third temperature and a third pressure, which have a higher value than the second pressure and the second temperature. Then, the medium is communicated (e.g., arrow C) to the secondary heat exchanger 130 that cools the medium to a fourth temperature and a fourth pressure, which have a lower value than the third pressure and the third temperature and are equal to the final pressure and the final temperature discussed above. The medium in turn exits (e.g., arrow D) the system 4.

Figure 2:
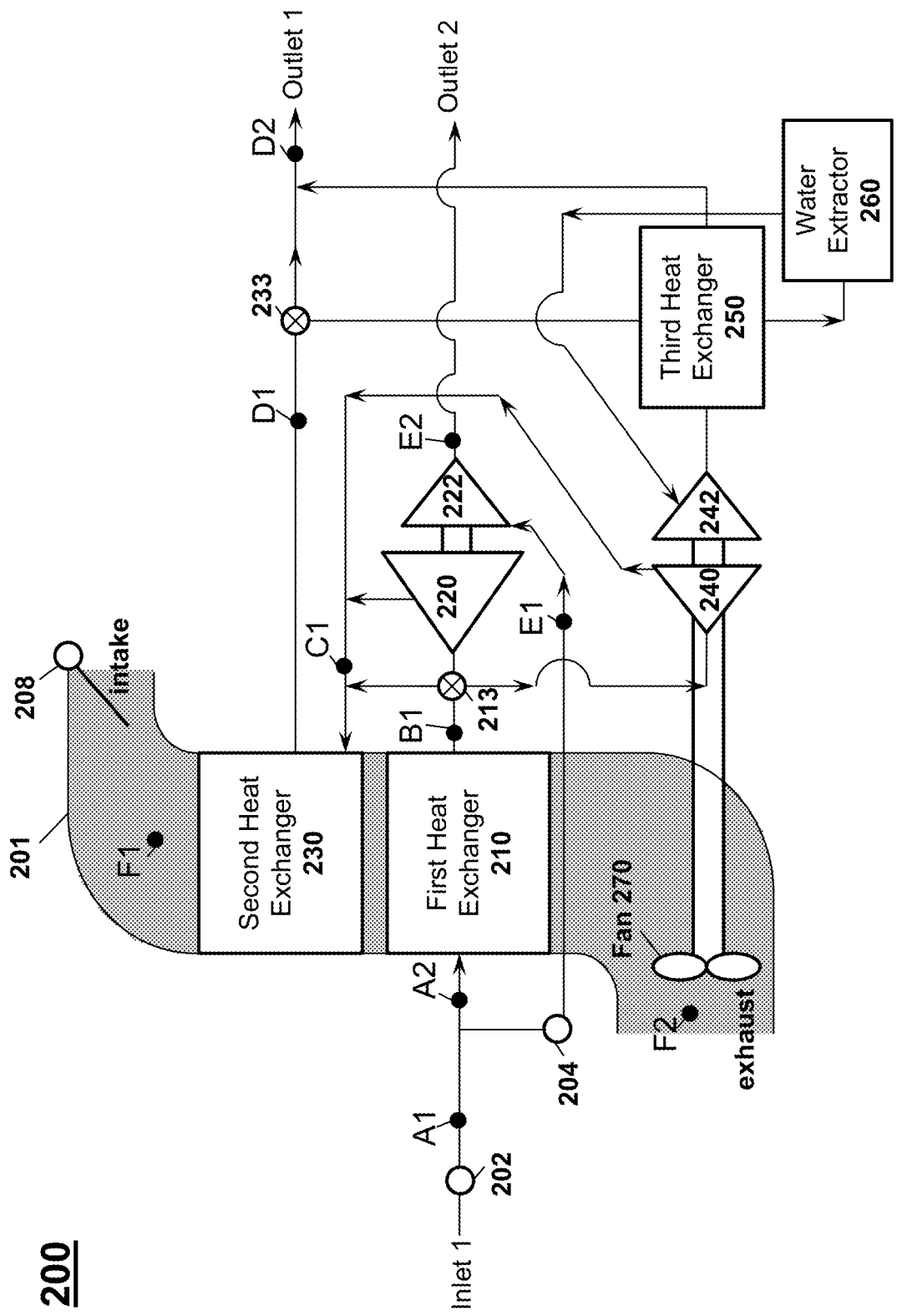
FIG. 2 is a block diagram of an example of a cabin air conditioning system that includes a turbo compressor according to one embodiment.

The system of FIG. 1 will now be described with reference to FIG. 2. FIG. 2 illustrates a cabin air conditioning system 200 (e.g., an ECS or system 100) that includes a shell 201, valves 202, 204, 208, a first heat exchanger 210 (e.g., primary heat exchanger 110), a flow valve 213, a compressor 220 and a turbine 222 (e.g., which combine to form the compressing device 120, such as a turbo compressor), a second heat exchanger 230 (e.g., secondary heat exchanger 230), a flow valve 233, a compressor 240, a turbine 242, a third heat exchanger 250, a water extractor 260, and a Fan 270, each of which are connected via tubes, pipes, and the like, such that bleed-air is accepted at Inlet 1 from a low pressure location of an engine compressor region at an initial flow rate, pressure, and temperature and provided to Outlet 1 at a final flow rate, pressure, and temperature. In this way, the credentials of the bleed-air at the Outlet 1 (e.g., the final flow rate, pressure, and temperature) enable an aircraft cabin to receive pressurized and cooled air from the cabin air conditioning system 200.

The cabin air conditioning system 200 is an example of an environmental control system (ECS) of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell. Valves, such as flow valves 202, 204, 208 and cross valves 213, 233, are devices that regulate, direct, and/or control a flow of a medium (e.g., gases, liquids, fluidized solids, or slurries, such as bleed-air) by opening, closing, or partially obstructing various passageways within the tubes, pipes, etc. of the cabin air conditioning system 200. Valves may be operated by actuators such that the flow rates of any medium in any portion of the cabin air conditioning system 200 may be regulated to a desired value. For example, the flow valve 208 enables the intake of ambient air external to the aircraft into the shell 201, such that the ambient air may pass through the first and second heat exchangers and cool the bleed-air before exiting as an exhaust (e.g., the method of intake may be a pull method by a Fan 270 driven by the shaft of the turbine 242 or a ram method as described above).

The first heat exchanger 210, second heat exchanger 230, and third heat exchanger 250 are examples of heat exchangers as described above, with the first and second heat exchangers 210, 230 corresponding to, for example, the primary heat exchanger 110 and the secondary heat exchanger 130. The compressor 220 is a mechanical device that regulates a pressure of the bleed-air received from the first heat exchanger and is driven by the turbine 222. The combination of the compressor 220 and turbine 222 may correspond to, for example, the compressing device 120 as described above. Similarly, the compressor 220 and the turbine 222 together regulate pressure and illustrate, for example, that the cabin air conditioning system 200 may operate as a three wheel air cycle machine. The water extractor 260 is a mechanical device that performs a process of taking water from any source, such as bleed-air, either temporarily or permanently.

As indicated above, bleeding air from a low pressure location causes less of a fuel burn than bleeding air from a high pressure location. Yet, when air is bled from a low pressure location, a drop in pressure occurs over the cabin air conditioning system 200, while the bleed-air is flowing from Inlet 1 to Outlet 1, where an internal pressure drops below a final pressure. If the air pressure drops below a pressure that is desired at the Outlet 1 (e.g., the final pressure), then the system will cease to supply the bleed-air to the aircraft cabin. Thus, the compressor 220 is employed to ensure that the bleed-air is boosted above the final pressure before being passed onto the second heat exchanger 230 and onto the Outlet 1 (e.g., thus, the first pressure of the bleed-air is regulated properly to the final pressure). To assist in further explanation of the pressure management by the compressor 220, FIG. 2 includes demarcation points A1 A2, B1, C1, D1, D2, E1, E2, F1, F2 that itemize the credentials of the bleed-air at that point in the cabin air conditioning system 200 (e.g., the change in flow-rate, pressure, and temperature during the flow of the bleed-air through the cabin air conditioning system 200). Note that the demarcation points A1-A2, B1, C1, and D1-D2 may respectively correspond to, for example, points along the arrows A, B, C, and D.

In one operational example, bleed-air is supplied (e.g., from a low pressure engine bleed) through the Inlet 1 at the flow valve 202 to the cabin air conditioning system 200. In this example, the credentials of demarcation point A1 are 160 lbs/min (2.4 PPS), 15.9 psia, 316° F. Then, before the bleed-air is passed to the first heat exchanger, some of the flow rate is leached/divided by the flow valve 204 such that a portion of the bleed-air is supplied to the turbine 222 while the rest of the bleed-air goes through the first heat exchanger 210. For example, if a flow rate of 15 lbs/min were leached from by the flow valve 204, then the credentials of demarcation point A2 would be 145 lbs/min, 12.6 psia, 316° F. and demarcation point E1 would be 15 lbs/min, 12.6 psia, 316° F.

When the bleed-air goes through the first heat exchanger 210, the first heat exchanger 210 cools the rest of the bleed-air. If the first heat exchanger 210 has efficiency equal to 89%, then the resulting credentials of the bleed-air after cooling at demarcation point B1 would be 145 lbs/min, 11.6 psia, 72.8° F. During this operation, the cross valve 213 directs the flow of the bleed-air into the compressor 220, which pressurizes the bleed-air based on the force applied from the shaft that communicatively couples the turbine 222 with the compressor 220. In this example, the resulting credentials of the bleed-air after pressurization at demarcation point C1 are 145 lbs/min, 13.0 psia, 94.9° F. In addition, once the portion of the bleed-air that was supplied to the turbine 222 is utilized by the turbine 222, that portion of the bleed-air proceeds to exit from the cabin air conditioning system 200 at Outlet 2 (e.g., flows overboard). Note that the credentials of demarcation point E2 are 15 lbs/min, 3.0 psia, 94° F. The bleed-air then goes through the second heat exchanger 230, which cools the bleed-air. If the second heat exchanger 230 has efficiency equal to 94%, then the resulting credentials of the bleed-air after cooling at demarcation point D1 would be 145 lbs/min, 12 psia, 12.1° F. The bleed-air then proceeds through the cross valve 233 and the Outlet 1 to the aircraft cabin. Note that the psia in this operational example drops below 12 psia after the first heat exchanger 210 cools the bleed-air and that the compressor 220 boosts the psia above 12 before the cooling by the second heat exchanger 210. Further, in this operational example, the ram-air flowing through the intake of the shell 207 at valve 208 includes the credentials of 325 lbs/min, 3.1 psia, 7° F. at demarcation point F1 and the exhaust includes the credentials of 325 lbs/min, 2.4 psia, 152.4° F. at demarcation point F2, such that the bleed-air may be cooled at the efficiencies noted above. In this way, the compressor 220 of the cabin air conditioning system 200 regulates/increases a pressure of bleed-air to, thus, allow for connecting a bleed air system to a low pressure location of an engine compressor region.

In addition, because the cabin air condition system 200 may operate in multiple different modes, the flow valve 233, the compressor 240, the turbine 242, the third heat exchanger 250, and the water extractor 260 may also engage the bleed-air to remove water from the bleed-air before the bleed-air is utilized in the aircraft cabin—while maintaining the same credentials as noted at demarcation point D1 (e.g., D2 should be 145 lbs/min, 12 psia, 12.1° F.).

The system of FIG. 1 will now be described with reference to FIG. 3. Note that some of the items of FIG. 2 are reused in FIG. 3 for ease of explanation. FIG. 3 that illustrates a cabin air conditioning system 300 (e.g., an ECS or system 100) that includes a shell 201, first heat exchanger 210 (e.g., primary heat exchanger 110), a flow valve 213, a second heat exchanger 230 (e.g., secondary heat exchanger 130), a flow valve 233, a compressor 240, a turbine 242, a third heat exchanger 250, a water extractor 260, a Fan 270, a valve 306, and an electric fan 320 (e.g., the compressing device 120), each of which are connected via tubes, pipes, and the like, such that bleed-air is accepted at Inlet 3 from a low pressure location of an engine compressor region at an initial flow rate, pressure, and temperature and provided to Outlet 3 at a final flow rate, pressure, and temperature. In this way, the credentials of the bleed-air at the Outlet 3 (e.g., the final flow rate, pressure, and temperature) enable an aircraft cabin to receive pressurized and cooled air from the cabin air conditioning system 300.

The cabin air conditioning system 300 is an example of an environmental control system (ECS) of an aircraft that provides air supply, thermal control, and cabin pressurization for the crew and passengers of the aircraft. The valve 306 is a valve or devices that regulate, direct, and/or control a flow of a medium, as described above. The electric fan 320 is a mechanical device that regulates a pressure of the bleed-air received from the first heat exchanger and is driven by a motor and may correspond to, for example, the compressing device 120 as described above. As above, the compressor 240 and the turbine 242 together regulate pressure and illustrate, for example, that the cabin air conditioning system 300 may operate as a three wheel air cycle machine.

As indicated above, bleeding air from a low pressure location causes less of a fuel burn than bleeding air from a high pressure location. Yet, when air is bled from a low pressure location, a drop in pressure occurs over the cabin air conditioning system 300, while the bleed-air is flowing from Inlet 3 to Outlet 3, where an internal pressure drops below a final pressure. If the air pressure drops below a pressure that is desired at the Outlet 3 (e.g., the final pressure), then the system will cease to supply the bleed-air to the aircraft cabin. Thus, the electric fan 320 is employed to ensure that the bleed-air is boosted above the final pressure before being passed onto the second heat exchanger 230 and onto the Outlet 3 (e.g., thus, the first pressure of the bleed-air is regulated properly to the final pressure). To assist in further explanation of the pressure management by the electric fan 320, FIG. 3 includes demarcation points A3, A4, B2, C2, D1, D2, F1, F3 that itemize the credentials of the bleed-air at that point in the cabin air conditioning system 300 (e.g., the change in flow-rate, pressure, and temperature during the flow of the bleed-air through the cabin air conditioning system 300). Note that the demarcation points A3-A4, C2, C2, and D1-D2 may respectively correspond to, for example, points along the arrows A, B, C, and D.

In one operational example, bleed-air is supplied (e.g., from a low pressure engine bleed) through the Inlet 1 at the flow valve 202 to the cabin air conditioning system 200. In this example, the credentials of demarcation point A3 are 145 lbs/min (2.4 PPS), 15.9 psia, 316° F. Then, before the bleed-air is passed to the first heat exchanger, the bleed-air maybe regulated by the flow valve 306. For example, the 15.9 psia of the bleed-air may be regulated by the flow valve 306, such that the credentials of demarcation point A4 would be 145 lbs/min, 13.2 psia, 316° F.

When the bleed-air goes through the first heat exchanger 210, the first heat exchanger 210 cools the rest of the bleed-air. If the first heat exchanger 210 has efficiency equal to 91%, then the resulting credentials of the bleed-air after cooling at demarcation point B2 would be 145 lbs/min, 12.2 psia, 58° F. During this operation, the cross valve 213 directs the flow of the bleed-air into the electric fan 320, which pressurizes the bleed-air based on the horse power of the fan (e.g., the horse power may range from 10 hp to 43 hp). In this example, the resulting credentials of the bleed-air after pressurization at demarcation point C2 are 145 lbs/min, 13.0 psia, 69° F. The bleed-air then goes through the second heat exchanger 230, which cools the bleed-air. If the second heat exchanger 230 has efficiency equal to 92%, then the resulting credentials of the bleed-air after cooling at demarcation point D1 would be 145 lbs/min, 12 psia, 12.1° F. The bleed-air then proceeds through the cross valve 233 and the Outlet 1 to the aircraft cabin. Note that the psia in this operational example drops to 12.2 psia after the first heat exchanger 210 cools the bleed-air and that the electric fan 320 boosts the psia bask to 13 before the cooling by the second heat exchanger 210. Further, in this operational example, the ram-air flowing through the intake of the shell 207 at valve 208 includes the credentials of 325 lbs/min, 3.1 psia, 7° F. at demarcation point F1 and the exhaust includes the credentials of 325 lbs/min, 2.4 psia, 148° F. at demarcation point F3, such that the bleed-air may be cooled at the efficiencies noted above. In this way, the electric fan 320 of the cabin air conditioning system 300 regulates/increases a pressure of bleed-air to, thus, allow for connecting a bleed air system to a low pressure location of an engine compressor region.

In addition, because the cabin air condition system 300 may operate in multiple different modes, the flow valve 233, the compressor 240, the turbine 242, the third heat exchanger 250, and the water extractor 260 may also engage the bleed-air to remove water from the bleed-air before the bleed-air is utilized in the aircraft cabin—while maintaining the same credentials as noted at demarcation point D1 (e.g., D2 should be 145 lbs/min, 12 psia, 12.1° F.).

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a plurality of heat exchangers comprising first and second heat exchangers;
    bleed-air flowing through the plurality of heat exchangers into a first outlet associated with a chamber;
    a second outlet distinct from the first outlet;
    a compressing device comprising a first shaft, a first compressor, and a first turbine, the compressing device being in communication with the first and second heat exchangers;
    a three wheel air cycle machine comprising a second shaft, a fan, a second compressor, and a second turbine, the second turbine driving the second compressor and the fan via the second shaft;
    a first valve located upstream from the first heat exchanger and controlling a retrieval of the bleed-air and dividing the bleed-air into a first bleed-air portion and a second bleed-air portion;
    a second valve located downstream of the first heat exchanger and directing a flow of the first bleed-air portion exiting the first heat exchanger into the first compressor or the second compressor; and
    a cross valve arranged downstream from the second heat exchanger operable to direct a flow of the bleed-air output from the second heat exchanger directly to the first outlet,
    wherein the first bleed-air portion flows through the first heat exchanger and the second bleed-air portion flows from the first valve, bypasses the plurality of heat exchangers, and is utilized by the first turbine to provide a power to the first compressor,
    wherein the bleed-air is bled at an original pressure from a low pressure location of an engine core,
    wherein a pressure drop for the first bleed-air portion occurs across the system, the pressure drop alters the original pressure of the first bleed-air portion to below a final pressure of the chamber,
    wherein the first turbine drives the first compressor via the first shaft in accordance with the power to provide a pressure boost to the first bleed-air portion flowing from the first heat exchanger, before the first bleed-air portion is passed to the second heat exchanger, wherein the pressure boost counter acts the pressure drop such that the first bleed-air portion output from the first turbine has a pressure at least equal to the final pressure of the chamber;
    wherein the bleed-air output from the first turbine is provided directly to the second outlet.

2. The system of claim 1, wherein the system is an environmental control system of an aircraft, and
    wherein the chamber is a cabin of the aircraft.

3. A method of providing a first bleed-air portion of a bleed-air to multiple outlets of an aircraft, the method comprising:
    providing, via a first valve, the first bleed-air portion to a first heat exchanger of a plurality of heat exchangers, the bleed-air being sourced from a low pressure portion of an engine core at an original pressure, the first valve being located upstream from the first heat exchanger, the first valve controlling and dividing the bleed-air into the first bleed-air portion and a second bleed-air portion;
    fluidly coupling, via a second valve being located downstream of the first heat exchanger, the first bleed-air portion exhausting from an output of the first heat exchanger to a compressing device or a three wheel air cycle machine,
    wherein the compressing device comprises a first shaft, a first compressor, and a first turbine,
    wherein the three wheel air cycle machine comprising a second shaft, a second fan, a second compressor, and a second turbine, the second turbine driving the second compressor and the fan via the second shaft, and wherein the second valve directs a flow of the first bleed-air portion exiting the first heat exchanger into the first compressor or the second compressor;

fluidly coupling the first bleed-air portion exhausting from an output of the compressing device to a second heat exchanger of the plurality of heat exchangers;

fluidly coupling the first bleed-air portion exhausting from an output of the second heat exchanger to a first outlet, wherein fluidly coupling the first bleed-air portion exhausting from the output of the second heat exchanger to the first outlet includes selectively operating a cross valve arranged downstream from the second heat exchanger to direct the first bleed-air portion exhausting from the output of the second heat exchanger directly to the first outlet, wherein a pressure drop for the first bleed-air portion occurs across the aircraft, the pressure drop alters the original pressure of the first bleed-air portion to below a final pressure of the first outlet;

providing, by the first turbine via the first shaft, a power to the first compressor utilizing the second bleed-air portion received from the first valve;

providing, by the first turbine in accordance with the power, a pressure boost to the first bleed-air portion flowing from the first heat exchanger, before the first bleed-air portion is passed to the second heat exchanger power, wherein the pressure boost counter acts the pressure drop such that the first bleed-air portion output from the first turbine has a pressure at least equal to the final pressure of the chamber; and providing the second bleed-air portion output from the first turbine directly to a second outlet.

* * * * *